US006567424B1

(12) United States Patent
Girardeau, Jr.

(10) Patent No.: US 6,567,424 B1
(45) Date of Patent: May 20, 2003

(54) APPARATUS AND METHOD FOR DETERMINING A SYNCHRONIZATION SIGNAL

(75) Inventor: James W. Girardeau, Jr., Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/971,257

(22) Filed: Nov. 17, 1997

Related U.S. Application Data

(63) Continuation of application No. 08/511,774, filed on Aug. 7, 1995.

(51) Int. Cl.[7] .................................................. H04J 3/06
(52) U.S. Cl. ...................................................... 370/509
(58) Field of Search ................................. 370/503, 509, 370/510, 512, 513, 514, 520; 375/360, 365, 368; 714/775, 798

(56) References Cited

U.S. PATENT DOCUMENTS

| 4,740,962 A | * | 4/1988 | Kish, III | 370/514 |
| 5,025,458 A | * | 6/1991 | Casper et al. | 375/365 |
| 5,058,141 A | * | 10/1991 | Kem et al. | 375/368 |
| 5,107,495 A | * | 4/1992 | Kamoi et al. | 370/510 |
| 5,123,013 A | * | 6/1992 | Hirayama | 370/389 |
| 5,140,618 A | * | 8/1992 | Kinoshita et al. | 375/368 |
| 5,228,036 A | * | 7/1993 | Okamoto et al. | 370/514 |
| 5,309,440 A | * | 5/1994 | Nakamura et al. | 370/420 |
| 5,317,572 A | * | 5/1994 | Satoh | 370/509 |
| 5,428,614 A | * | 6/1995 | Shaver | 370/474 |
| 5,509,036 A | * | 4/1996 | Nakata | 375/368 |

* cited by examiner

Primary Examiner—Kwang Bin Yao

(57) ABSTRACT

The present invention relates to circuitry and an associated method for detecting a synchronization signal in a multimedia data transmission system. Preferably, the circuitry (10) includes process controller (40), memory (44), and a comparator (46). The process controller (40) controls the receipt of bit groups of data (52) and the storage of the bit groups of data (50) in the memory (44). The memory (44) operably couples to the process controller (40), receives the data, and stores the data in a predetermined order based upon the process controller (40). The comparator (46) couples to the process controller (40) and the memory (44) and compares the corresponding index locations of the bit groups (52) to a synchronization pattern (58). When the synchronization pattern (58) matches the predetermined set of bit groups (52), the comparator (46) generates the synchronization detection signal (60). The synchronization detection signal (60) then allows further equipment within the receiver to selectively operate on the data blocks received.

13 Claims, 5 Drawing Sheets

APPARATUS AND METHOD FOR DETERMINING A SYNCHRONIZATION SIGNAL

This application is a continuation patent application Ser. No. 08/511,774 filed Aug. 7, 1995

TECHNICAL FIELD OF THE INVENTION

This invention relates generally to the transmission and receipt of digitized information, and more particularly relates to an apparatus and method for determining a synchronization signal within an accumulation of received data.

BACKGROUND OF THE INVENTION

The transmission and receipt of digital data across a communication link has been known in the art for years. In a typical communication system, a transmitter transmits data over a transmission path to a remotely located receiver. The receiver receives the data and passes the data along so that it may be used. As one skilled in the art will readily appreciate, many types of transmitting and receiving equipment may be employed depending upon particular data transmission and receipt requirements.

In modern digital communication systems, data transmission requirements are great. Thus, digital signals are transmitted and received at high frequencies. Thus, equipment at both the transmitting and receiving location must be capable of handling data at the high data transmission rates. In some applications, a single data link is insufficient to obtain large enough data transmission rates. Thus, multiple data links are often employed to obtain the required data transmission rate. As one skilled in the art will readily appreciate, the transmission and receipt of digital data at high frequencies and the associated processing requirements for separating and combining signals requires substantial resources of great complexities.

To somewhat simplify the data transmission and receipt process, standardized protocols have been established. Digital data typically is organized into blocks of digital data, each data block comprising a plurality of bit groups, with the data blocks encoded at the transmitting location and transmitted across the data link. However, data is typically transmitted as a bit stream and it is difficult to relate a particular bit to a corresponding data location. Thus, the transmitter and receiver have been designed to segregate the bit stream into the bit groups. Upon receipt, the bit groups are stored at the receiving location in a sequential manner and represent a sequential bit group in a block of data.

However, when data transmissions are initiated or otherwise interrupted, the receiver does not know which received bit group is the first bit group of a data block and which bit group is the last bit group of the data block. Thus, a synchronization signal is encoded into each data block so that the receiver may determine which bit group is the first bit group in the data block and which bit group represents the last bit group in the data block. Once a synchronization signal is determined, the receiver synchronizes to each subsequently received data block and handles the bit groups accordingly.

In a standard communication protocol, the synchronization signal encoded in a plurality of last bits in various bit groups. For example, in the case of the H.221 communication protocol, each bit group is one byte of data and each data block contains 80 bytes. The synchronization signal is encoded in the eighth bit position of sequentially received bytes of the data block. Thus, by viewing the eighth bit position of a sequentially received number of bytes, the synchronization signal may be determined, and the starting byte and ending byte of each data block may also be determined. Further, because data blocks are transmitted and received sequentially, once a particular starting byte has been determined, the receiver has "locked" onto the particular received signal and recognizes each subsequent data block as it is received.

Each data block in a video teleconference may contain audio data, video data, user data, data relating to the control of the other data, time stamp information, and attributes of the equipment at the receiving and transmitting locations. After data is received by the receiver and it is ordered properly, further processing is performed by the receiver so that it can generate the audio, video, and control signals.

In the case of a receiving-transmitting pair that uses a plurality of transmission paths, data blocks may be skewed in time such that they must be reassembled upon receipt. For example, in a system employing five transmission paths with each path sharing a portion of the data transmission workload, data transmitted over respective paths is often skewed in time. In systems employing a plurality of transmissions, once the synchronization signal is determined on each transmission path, the time skewing of the signals may be determined and the timing of the receipt of signals may be determined. Once the synchronization signals are determined for the various transmission paths, the differing blocks of data may more easily be related to one another over time. Time stamps contained in the blocks may be accessed if required and an expeditious reconstruction of the total signal may be accomplished with reduced processing.

One prior art solution for determining the synchronous signal involved using a large shift register having a width of 167 bits. This particular prior art device looked at an ending bit of each byte received by the receiver, shifted the bit into the shift register, and did the same for the remaining 166 ending bits. Decoding circuitry associated with the shift register viewed the 1st through 7th bits, 81st bit, and 161st through 167th bits, and compared the bits with a known synchronization pattern. When a match occurred, the synchronization signal was found and a signal was transmitted from the device to indicate which byte represented the start of the data block. While the particular prior art device accurately determined the synchronous signal, it required significant hardware. Further, in some systems, bits of a transmitted bit group may be transposed due to operation of repeaters along the transmission line. Thus, after transposition, the synchronization signal may reside in an unexpected bit location. The described prior art device could not detect the presence of the synchronization signal in an unexpected bit location. Thus, in some systems the prior art device could not function to determine the synchronization signal.

Another prior art device looked at a single bit of each byte received from the data transmission path and used the bit as an input to a state machine. The state machine, if it received the proper input for seven sequential bits, entered a delay cycle and waited for an 81st bit to compare and check to determine if the bit compared correctly to the expected value. If so, the prior art device issued a synchronization block signal to further components in the system. While this system was inexpensive, it could easily miss the synchronous signal due to falsing, in which case, it would miss a true synchronization signal and would have to wait until the next data block to reinitiate its operation. Further, this prior art device also could not detect the synchronization signal in a bit location other than the expected bit location.

Thus, there exists a need in the art for a highly reliable synchronization signal detect circuit that is efficient in detecting valid blocks, while minimizing the hardware required.

DETAILED DESCRIPTION OF THE DRAWINGS

The present invention relates to an apparatus and method for detecting a synchronization signal in a multi-media data transmission system. Preferably, the apparatus includes a process controller, memory, and a comparator. The process controller controls the receipt of bit groups of data and the storage of the bit groups of data in the memory. The memory operably couples to the process controller, receives the data, and stores the data in a predetermined order based upon the process controller. The comparator couples to the process controller and the memory and compares the corresponding index locations of a predetermined set of the bit groups of a plurality of bit groups with a synchronization pattern. When the predetermined set of bit groups of the plurality of bit groups matches the synchronization pattern, the comparator generates the synchronization detection signal. The synchronization detection signal then allows further equipment within the receiver to selectively operate on the data blocks received.

Figure 1:
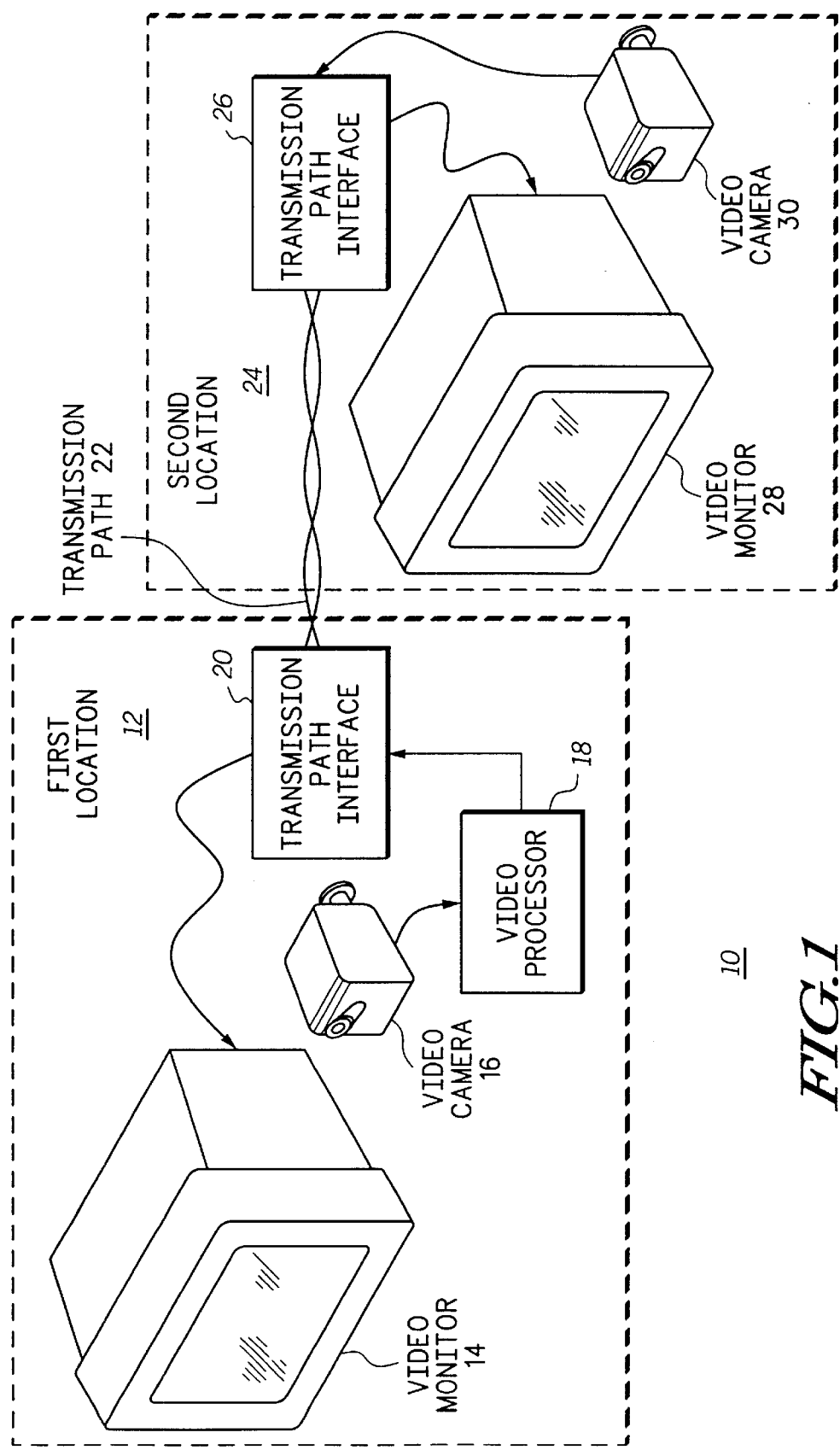
FIG. 1 illustrates a block diagram of an apparatus for video conferencing incorporating the teachings of the present invention.

FIG. 1 illustrates an apparatus 10 for video conferencing, the apparatus 10 comprising equipment at a first location 12 and equipment at a second location 24. The equipment at the first location 12 comprises a first video monitor 14, a first video camera 16, a video processor 18, and a first transmission path interface 20. Preferably, at the second location, the apparatus 10 includes a second transmission path interface 26, a second video monitor 28, and a second video camera 30. The first transmission path interface 20 and the second transmission path interface 26 operably couple via transmission path 22.

The first transmission path interface 20 interoperably couples to the first video camera 16, the first video monitor 14, and the transmission path 22. Preferably, the video camera 16 provides data to the video processor 18, which then couples the data to the transmission path interface 20. The video processor 18 processes data provided by the first video camera 16.

As is known in the art, the video processor 18 encodes the large band of video data received from the video camera 16 into a compressed format such that it may more easily be transmitted across the transmission path 22 to the transmission path interface 20. Video monitors 14 and 28, video cameras 16 and 30, video processor 18, and transmission path 20 are elements commonly known in the art and will not further be discussed herein except to expand on the principles of the present invention.

Figure 2:
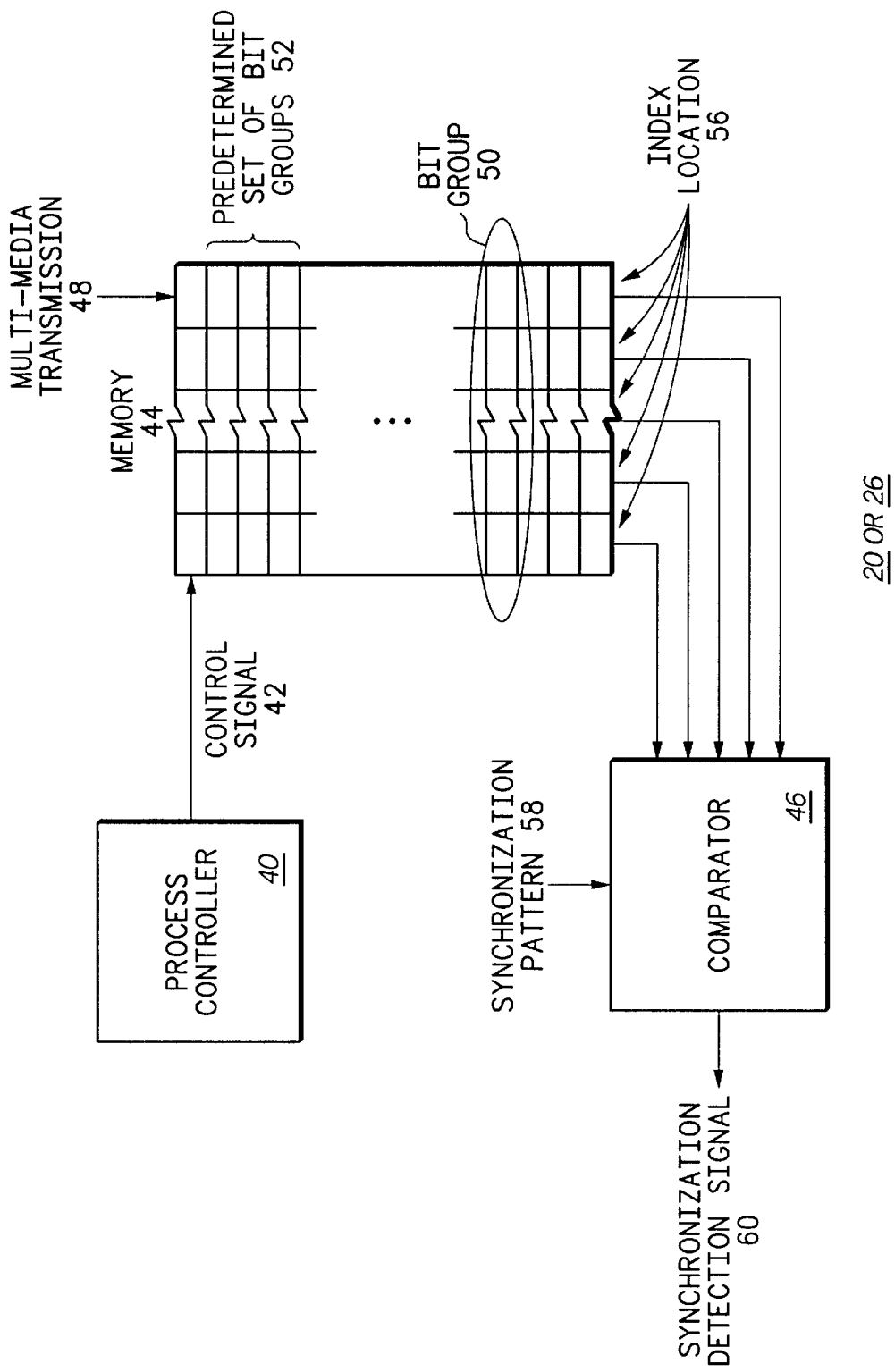
FIG. 2 illustrates a block diagram of a multi-media synchronization detection circuit incorporating the teachings of the present invention.

FIG. 2 illustrates components contained within either the first transmission path interface 20 or the second transmission path interface 26 for implementing the teachings of the present invention. Preferably, the first transmission path interface 20 and the second transmission path interface 26 are identical in construction such that either could interface to receive or transmit signals. As one skilled in the art will readily appreciate, however, the transmission path interfaces 20 and 26 will include elements in addition to those illustrated in FIG. 2. Additional elements that may be included in the transmission path interfaces 20 and 26 not relating to the present invention, however, will not be discussed.

In one application of the present invention, the transmission path interface 20 operates in conjunction with a single transmission path 22 (FIG. 1). However, the present invention may operate in conjunction with multiple transmission paths and determine synchronization signals on each transmission path. Thus, the present invention does not limit the type or number of transmission paths 22 upon which circuitry of the invention operates.

The first transmission path interface 20 preferably comprises a process controller 40, memory 44, and comparator 46. The memory 44 operably couples to the process controller 40 and receives a control signal 42 from the process controller. Control signal 42 causes the memory 44 to store bit groups in a predetermined order. Preferably, the memory 44 stores a multi-media transmission 48 as a plurality of bit groups within the memory 44. Preferably, control signals 42 control the memory 44 such that the bit stream which comprises the multi-media transmission 48 is stored in the memory 44 as it is received in a sequential fashion. Also preferably, the transmission path interface 20 includes additional circuitry which separates the multi-media transmission 48 into bit groups as it is received. Thus, each of the bit groups 50 of the multi-media transmission 48 are stored in memory 44 in a sequential fashion. In a typical application of the present invention, with the H.221 protocol, each bit group 50 comprises a byte of data.

The comparator 46 operably couples to the process controller 40 and the memory 44. The comparator 46 compares corresponding positions of index location 56 of a predetermined set of bit groups 52 of the plurality of bit groups with a synchronization pattern 58. The comparator 46 generates a synchronization detection signal 60 when one of the corresponding positions of index locations 56 of the predetermined set of bit groups 52 substantially matches the synchronization pattern 58.

As one skilled in the art will readily appreciate, depending upon the particular system in which the present invention operates, the synchronization signal may be of differing lengths and may reside in various positions within the multi-media transmission 48. The flexibility of the present invention allows adaptation to any of a variety of implementations of the synchronization signal in varying systems. In a system implementing the H.221 protocol, for example, the synchronization signal is made up of one bit from each of the predetermined set of bit groups 52 with the eighth bit of the predetermined set of bit groups 52 corresponding to the position in index location 56 in which the synchronization signal will be found. However, as was previously discussed, transposition of bit locations during the transmission of the multi-media transmission 48 may have caused the synchronization signal to reside in a position of the index location 56 other than the eighth location.

As was previously discussed, the bits of a bit group 50 may be transposed during transmission across the transmission path 22. Considering that each bit group 50 would have been transposed in a like manner, the synchronization signal would reside in a certain position of the index location 56 of the predetermined set of bit groups 52. Thus, the comparator 46 looks at each position of index location 56 of the predetermined set of bit groups 52 for the synchronization signal. The synchronization detection signal 60 represents not only the relative position of the beginning and ending bit groups 50 of each data block of the multi-media transmission 48, but also represents in which bit location of the predetermined set of bit groups 52 the synchronization signal resides. Thus, additional circuitry within the transmission path interface 20 employs the synchronization detection signal 60 to reorder the bits in the multi-media transmission 48 to place them in their proper locations. As one skilled in the art will readily appreciate, the transposition may simply require reorienting the bit locations within each bit group 50 or may require more complex operations.

After the synchronization signal is determined and the synchronization detection signal 60 is produced, further components within the video conferencing apparatus 10 may be employed to operate on the data blocks received. In this fashion, the video conference is facilitated by providing the correct video signals at each location, as well as the correct analog signals.

As one skilled in the art will readily appreciate, the first transmission path interface 20 provides important benefits over the prior art synchronization detection circuitry. Because memory 44 must be employed in any situation to receive a multi-media transmission 48 the present invention requires no further memory. Further, because the process controller 40 must provide control signals 42 to the memory 44 in any situation to store incoming multi-media transmission 48, reprogramming the process controller 40 to perform the additional desired functions of the present invention requires little incremental cost. Further, because the present invention searches each position of index location 56 of the multi-media transmission 48 bit groups 50, the present invention compensates for bit transposition, which the prior art devices did not.

The apparatus 10 of the present invention may be employed in varying fashions to obtain synchronization signals as they may appear in any of the bit locations within the predetermined set of bit groups 52.

Further, the apparatus may be easily modified to detect the synchronization signal of a particular value, depending upon the application involved. For example, in the United States a synchronization signal may have a certain hexadecimal or binary value, while in a European application, the synchronization signal may have a larger or smaller hexadecimal or binary value. Thus, the present invention may be easily modified for applications in differing environments.

Figure 3:
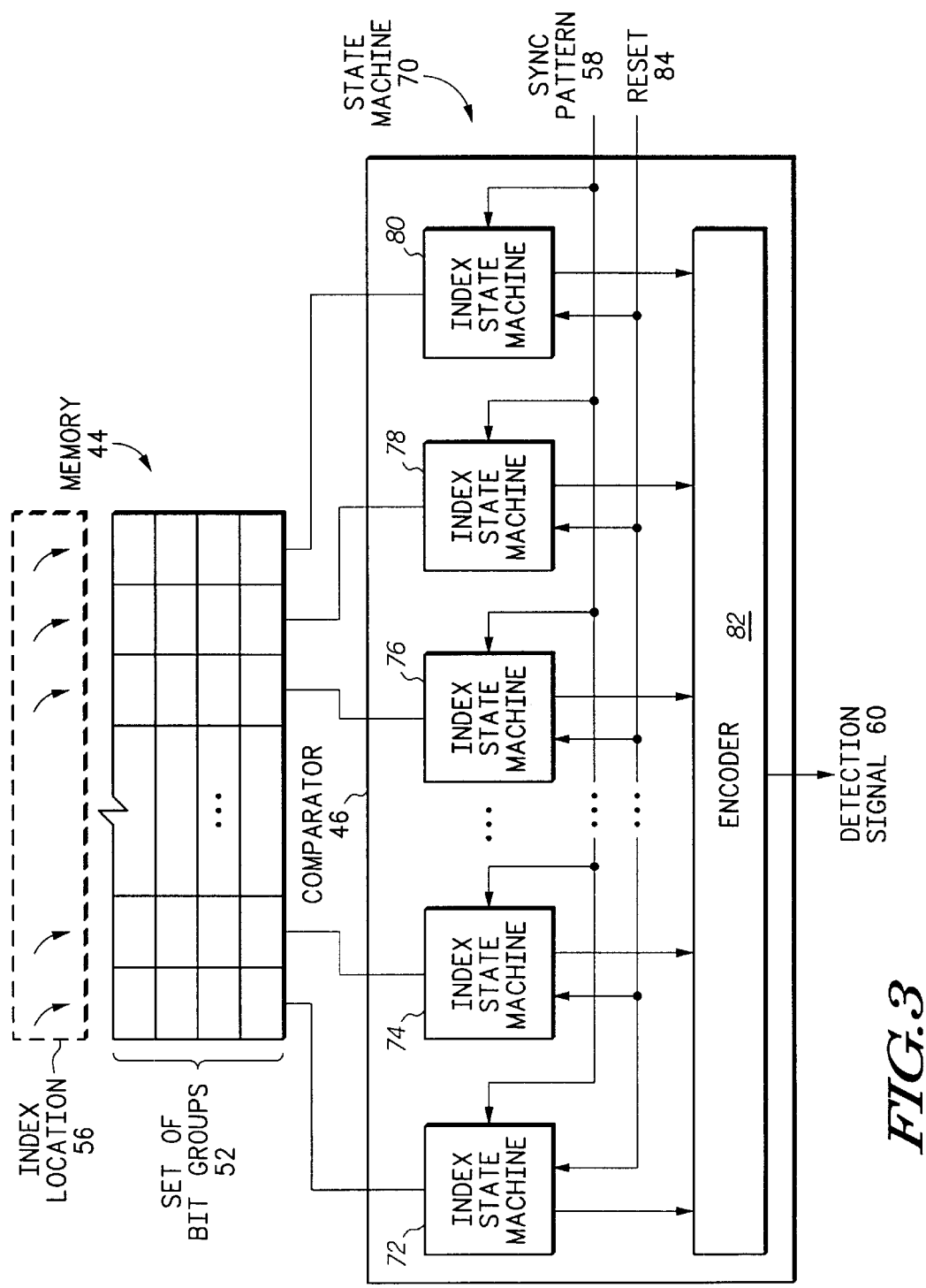
FIG. 3 illustrates a block diagram of the memory and comparator of the multi-media synchronization detection circuit of FIG. 2.

FIG. 3 illustrates in more detail the memory 44 and comparator 46 of the multi-media synchronization detection apparatus 10 of FIGS. 1 and 2. Preferably, the comparator 46 comprises a state machine 70 that includes a plurality of index state machines, numbered as 72 through 80. A first index state machine 72 receives bits from a first position of index locations 56 of a set of bit groups 52. A second index state machine 74 receives bits from a second index location of the set of bit groups 52. A third index state machine 76 receives bits from a third index location of the set of bit groups 52. A fourth index state machine 78 receives bits from a fourth index location of the set of bit groups 52, while finally, a fifth index state machine 80 receives bits of the set of bit groups 52 from a fifth position of index locations 56. The comparator 46, during a search operation, searches the set of bit groups 52 of the plurality of bit groups 50 taken from predetermined locations of the memory. In a typical application, the set of bit groups 52 is chosen based upon an expected location of the synchronization signal while a new set of bit groups is chosen after the receipt of an additional bit group and searched for the synchronization signal until the signal is found.

In an embodiment of the present invention for implemented with the H.221 protocol, the state machine 70 includes eight index state machines, each index state machine operates on a particular bit, or position of index location 56, of the bit groups 52. Because the state machine 70 includes an index state machine for each of the bit groups, the state machine 70 will detect the synchronization signal if it resides in any position of index locations 56 of the bit group 50. In the H.221 protocol, the set of bit groups 52 comprises the 1st through 7th bit, 81st bit, and 161st through 167th bits of bit groups 50, and each index location 56 position of the set of bit groups 52 is then searched for the synchronization signal.

As one skilled in the art will readily appreciate, a full multi-media transmission 48 must have been received so that the memory 44 contains only valid data before the synchronization signal may be found. Thus, at the initiation of a multi-media transmission 48, the operation of the invention must be delayed until the memory 44 fills with valid bit groups 50. Only after the memory 44 fills with valid bit groups 50 will a first set of bit groups 52 be provided to the comparator 46.

Once a full set of data has been received via a multi-media transmission 48 has been received, the comparator 46 initiates its search for the synchronization signal. A reset 84 signal is first asserted such that the index state machines 72 through 80 each enter a reset state. Then, a first bit group 50 of the set of bit groups 52 is provided to the state machine 70. Concurrently, an expected synchronization pattern 58 is provided to each index state machines 72 through 80 to be compared to the synchronization pattern 58. As one skilled in the art will readily appreciate, the synchronization pattern 58 could comprise N bits so as to provide the full expected synchronization pattern 58 or may be altered at every state of the state machine 70.

Sequentially, bit groups 50 of the set of bit groups 52 are provided to the state machine 70 for comparison to the next expected bit of the synchronization signal. When the state machine 70 has stepped through the set of bit groups 52, if a respective position of index location 56 of the set of bit groups 52 has matched the synchronization pattern 58, the respective index state machine asserts a signal to the encoder 82. The encoder 82 then produces a detection signal 60 which indicates in which position of index location 56 the synchronization signal has been located.

For example, if the synchronization signal is found in the 7th position of index location 56, the respective state machine 78 asserts a signal to the encoder 82, and the encoder 82, in turn, provides a detection signal indicating that the synchronization signal was found in the 7th position of index location 56 for the particular memory 44 contents.

Thus, when the synchronization signal is found, the circuitry in which the present invention resides may identify which bit group 50 comprises the beginning bit group of a block of data and which bit group 50 comprises the ending block of data, and also, to what extent the bits in the bit group 50 have been transposed.

As one skilled in the art will readily appreciate, the synchronization signal may not be found in the first set of bit groups 52 searched. If synchronization signal is not found in the particular set of bit groups 52 of the multi-media transmission 48, another set of bit groups 52 is received from memory 44. The new set of bit groups 52 preferably contains additional portions of the multi-media transmission 48. Preferably, the search is performed after the receipt of each bit group 50 into memory 44 until the synchronization signal is found. Once the synchronization signal is found, the associated system may synchronize to the incoming multi-media transmission 48 and may identify the first bit group of each respective block of data received thereafter. The present invention may be employed periodically to confirm that the system has synchronized to a correct synchronization signal.

Because each index state machine is substantially identical to each other index state machine, hardware requirements are minimal. Further, because each position of index locations 56 of the set of bit groups 52 is monitored, the synchronization signal will be detected in any position of index location 56 that it resides. The present invention provides the benefits of secure operation and reduced hardware complexity and cost. Thus, the benefits obtained by the present invention over the prior art allow for data integrity to be met at minimum cost.

Figure 4:
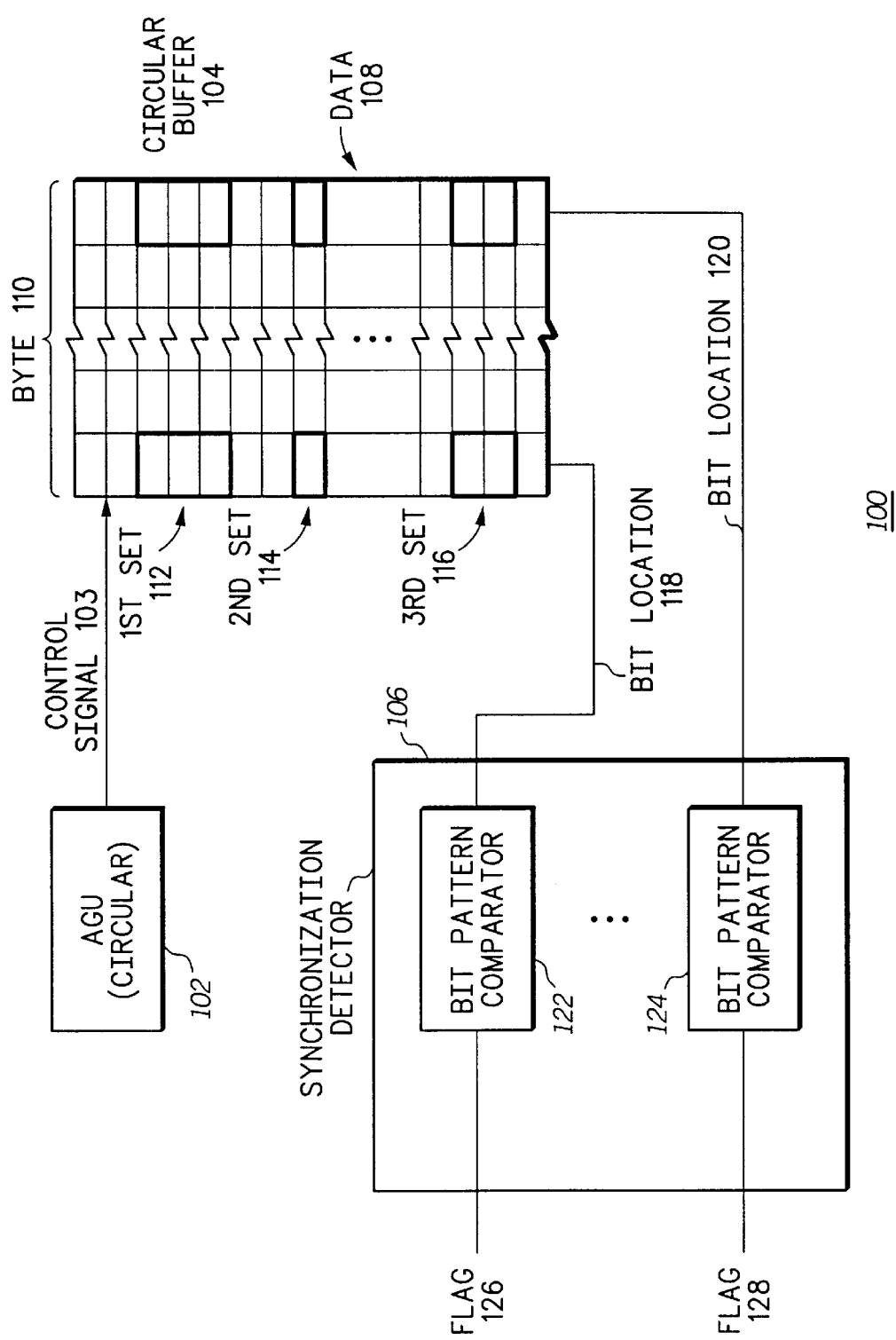
FIG. 4 illustrates a block diagram of a multi-media synchronization circuit also incorporating the principles of the present invention.

FIG. 4 illustrates an alternative multi-media synchronization detection circuit 100 incorporating the principles of the present invention. The multi-media synchronization detection circuit 100 comprises an address generation unit 102, a circular buffer 104, and a synchronization detector 106. The circular buffer 104 operably couples to the address generation unit 102 and receives a control signal 103 from the address generation unit 102. The control signal 103 instructs the circular buffer 102 to store a multi-media transmission 48 in a predetermined order in the circular buffer. Preferably, the circular buffer 104 stores the data 108 as a plurality of bit groups in the circular buffer 104, wherein each bit group is stored as a byte 110, the byte 110 being a row of data in the circular buffer 104.

The synchronization detector 106 comprises a plurality of bit pattern comparators 122 through 124 that receive data from bit locations 118 through 120 respectively. The synchronization detector 106 operably couples to the address generation unit 102 and the circular buffer 104. The synchronization detector 106 compares bit columns of the predetermined set of bit groups with the synchronization pattern. The synchronization detector 106 generates a synchronization detection signal, or flag 126 or 128, when one of the bit columns of the predetermined set of bit groups substantially matches the synchronization pattern.

In the preferred embodiment, the synchronization detector 106 receives a plurality of bits from a first set of bit groups 112, a second set of bit groups 114, and a third set of bit groups 116. A first bit pattern comparator 122 sequentially receives the bits of data from bit location 118 and compares the data to the synchronization pattern. Bit pattern comparator 124 receives bits of data from the bit location 120 corresponding to the first set of bit groups 112, the second set of bit groups 114, and the third set of bit groups 116.

Upon the comparison of the bits of data received from the bit locations 118 and 120, the synchronization detector 106 issues a flag.

The flag asserted directly relates to the bit location corresponding to the location of the synchronization signal. For example, when the bit pattern comparator 122 receives data from bit location 118 corresponding to the synchronization signal, the synchronization detector 106 will assert flag 126. In the same fashion, when bit pattern comparator 124 receives the stream of bits from bit location 120 corresponding to the synchronization signal, the synchronization detector 106 asserts flag 128. Based upon the asserted flag, associated circuitry may reorder the data contained within the circular buffer depending upon whether the data includes bits that have been transposed.

As one skilled in the art will readily appreciate, the components shown in FIG. 4 correspond to some of the components resident in a digital signal processing chip. For example, the address generation unit 102 is typically resident in a digital signal processing (DSP) chip, as is the capability of organizing a circular buffer 104. Thus, the present invention may be added to a DSP by simply adding synchronization detector 106 that addresses the circular buffer 104 contents via bit location connections. The additional circuitry required to be added to a DSP chip to implement the teachings of the present invention is minimal. However, the benefits achieved through adding the circuitry of the present invention 100 are great.

Figure 5:
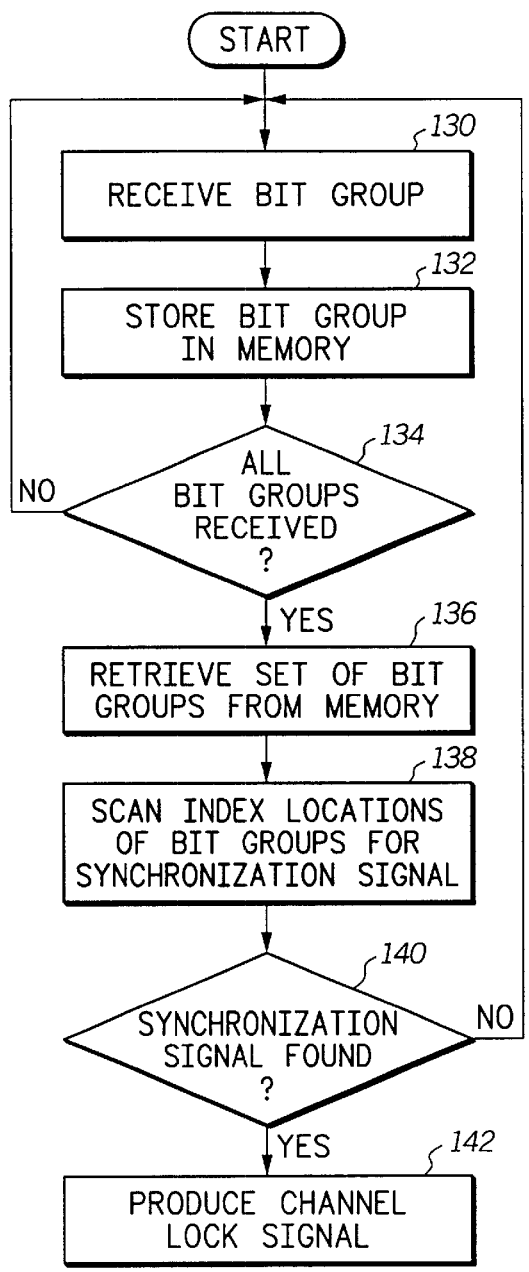
FIG. 5 illustrates a logic diagram of a method for detecting a synchronization signal in a multi-media data transmission in accordance with the principles of the present invention.

FIG. 5 illustrates a flow diagram of a method for detecting a synchronization signal in a multi-media data transmission in accordance with the teachings of the present invention. The method includes as a first step 130, receiving a plurality of bits groups, wherein the plurality of bit groups represents at least a portion of the multi-media data transmission. At step 132, the method includes storing the plurality of bit groups into a memory based on a predetermined storage technique. Preferably, the predetermined storage technique would be to organize the data in memory sequentially, such that the bit groups are stored in order as they are received.

At decision step 134, the method queries whether all bit groups have been received. This step is required so that the detection of the synchronization signal is not performed until valid data has been received in the memory. The synchronization signals should not and cannot be detected prior to the receipt of a full set of valid data. Thus, the method will return to step 130 until the full set of data is received. After a full set of data has been received, the answer to the decision step 134 is "yes".

At block 136, the step of retrieving at least a first set of bit groups of the plurality of bit groups from predetermined locations of the memory is performed. The first set of bit groups of the plurality of bit groups correspond to those locations within the memory that the synchronization signal is expected to be present. At step 138 the method includes scanning corresponding index locations of each of the first set of bit groups for the synchronization signal. Step 138 would be performed after each bit group is received assuming that a full set of bit groups has already been received. At step 140, it is determined whether the synchronization signal has been found. If the synchronization signal has been found, the method proceeds to block 142, wherein a channel lock signal is produced. The channel lock signal corresponds to not only a bit location within the bit group, but also indexes the starting and ending locations of valid blocks of data that comprise the multi-media data transmission. If, at step 140, the synchronization signal is not found, the method proceeds again to step 130, wherein another bit group is received. Thus, the method of the present invention continues until the synchronization signal is found. Once found, the method would not continue until the synchronization signal had been lost or for some other reason that was desirable to again find the synchronization signal.

Figure 6:
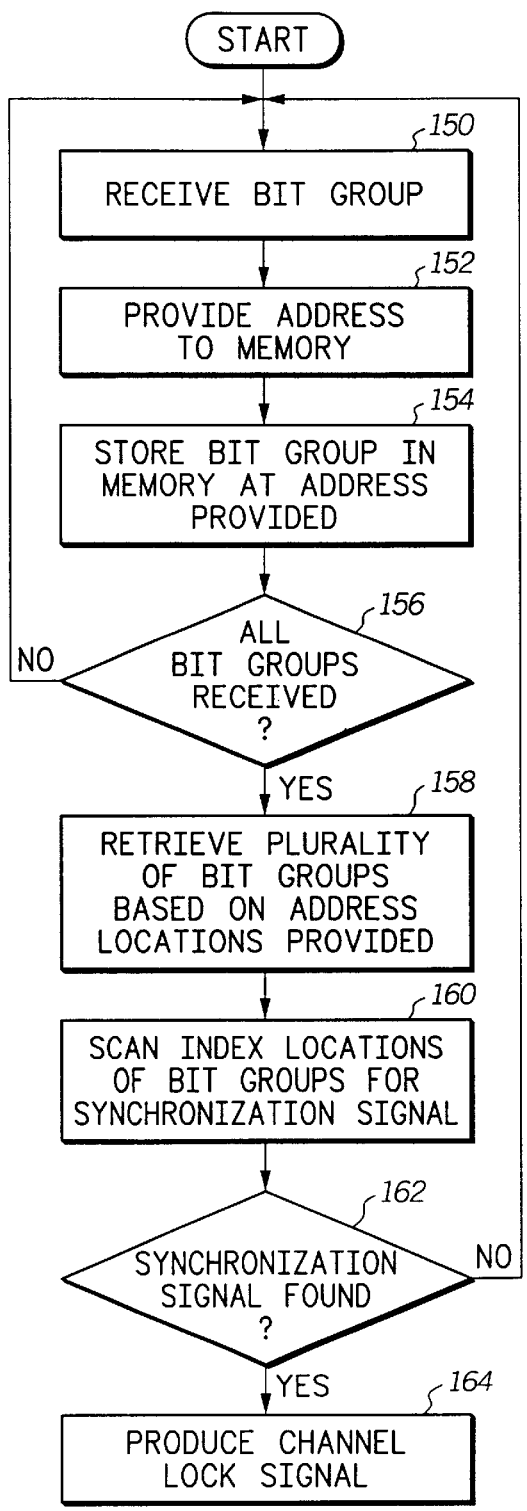
FIG. 6 illustrates a logic diagram of an alternate method for detecting a synchronization signal in accordance with the principles of the present invention.

FIG. 6 illustrates a flow block diagram of a method for detecting synchronization signal multi-media data transmission also comprising the teachings of the present invention. The method includes, at step 150, receiving a plurality of bit groups, wherein the plurality of bit groups represents at least a portion of the multi-media data transmission. At step 152, the method includes providing a plurality of addresses to a memory, each of the plurality of addresses corresponding to one of the plurality of bit groups. Step 152 facilitates the selective storage of the bit groups within the memory such that the data contained within the memory can be operated upon in a logical manner. At step 154, the plurality of bit groups are stored in a memory based upon the addresses provided. Step 154 may include storing the bit groups within the memory in a circular buffer format such that, when the memory is full, the next sequentially received bit group is simply stored in a first memory location. The circular buffer storage is advantageous for use with the present invention, since continual operations on the data are performed. At decision step 156, it is determined whether all bit groups of a corresponding data group have been received. As was previously described, a synchronization signal may not be detected until at least one full data block has been received in memory. If not all bit groups have been received at step 156, the method proceeds again to step 150, wherein another bit group is received. Once a certain number of bit groups have been received, decision block 156 always yields "yes" for a result, wherein the method proceeds to step 158.

At step 158, at least one of the plurality of bit groups is received from predetermined locations of the memory, wherein each bit group comprises at least two bits. Preferably, each bit group comprises eight bits, such as is in the case in a standard data transmission and reception system. At step 160, the method includes scanning corresponding index locations of each of the bit groups for the synchronization signal. At decision block 162, it is determined whether the synchronization signal is found. If the synchronization signal is found, the method proceeds to step 164, wherein a channel lock signal is produced. The channel lock signal corresponds not only to a data location within the multi-media data transmission that a block starts and ends, but also to a time that a certain data block has been received by the system. If, at step 162, the synchronization signal is not found, the method returns to step 150, wherein another bit group is received.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. A method for detecting a synchronization signal in a multi-media data transmission, the method comprising the steps of receiving a plurality of bit groups, wherein the plurality of bit groups represents at least a portion of the multi-media data transmission;

storing the plurality of bit groups into a memory based on a predetermined storage technique, wherein each stored bit group within the plurality of bit groups has a plurality of index locations;

retrieving at least a first set of bit groups of the plurality of bit groups from predetermined locations of the memory; and monitoring the plurality of index locations of each of the first set of bit groups for the synchronization signal.

2. The method of claim 1 wherein the step retrieving at least a first set of bit groups further comprises retrieving a second set of bit groups of the plurality of bit groups from second predetermined locations in the memory.

3. The method of claim 2 wherein the step retrieving at least a first set of bit groups further comprises retrieving a third set of bit groups of the plurality of bit groups from third predetermined locations in the memory.

4. The method of claim 3 wherein the step monitoring the plurality of index locations further comprises comparing the plurality of index locations of the first set of bit groups, the second set of bit groups, and the third set of bit groups with a known synchronization pattern.

5. The method of claim 1 wherein the step receiving a plurality of bit groups further comprises receiving a plurality of bytes, each corresponding to one of the plurality of bit groups, and the step of storing further comprises storing the bytes into a memory based on a predetermined storage technique, wherein each stored byte within the plurality of bytes has a plurality of index locations, each index location is associated with a specific bit location within the byte.

6. The method of claim 5 wherein the step of scanning index locations further comprises scanning one bit location of each of the plurality of bytes in the first set of bit groups for the synchronization signal.

7. A multi-media synchronization detection circuit comprising:

a process controller;

a memory operably coupled to the process controller, wherein the process controller provides a control signal to the memory, for instructing the memory to store a multi-media transmission in a predetermined order, and the memory stores the multi-media transmission as a plurality of bit groups, wherein there is a plurality of index locations associated with each bit group within the plurality of bit groups, wherein each one of the plurality of index locations references a portion of the stored multi-media transmission; and a comparator operably coupled to the process controller and the memory, wherein the comparator performs a comparison between each of the portions of the multi-media transmission referenced by one of the plurality of index locations and a synchronization pattern, and the comparator for generating a synchronization detection signal when the portion of the multi-media transmission matches the synchronization pattern.

8. The multi-media synchronization detection circuit of claim 7 wherein the comparator further comprises a state machine that performs the comparison of the corresponding index locations of the plurality of bit groups with the synchronization pattern.

9. The multi-media synchronization detection circuit of claim 8 wherein the state machine further comprises a plurality of index state machines, each index state machine performs a comparison of a particular index location of the plurality of bit groups with the synchronization pattern.

10. The multi-media synchronization detection circuit of claim 7 wherein each bit group comprises a byte.

11. The multi-media synchronization detection circuit of claim 10 wherein each corresponding index location is a bit location of a byte.

12. A multi-media synchronization detection circuit comprising:
   an address generation unit;
   a circular buffer operably coupled to the address generation unit, wherein the address generation unit provides a control signal to the circular buffer, wherein the control signal instructs the circular buffer to store a multi-media transmission in a predetermined order, wherein the circular buffer stores the multi-media transmission as a plurality of bit groups, and wherein each bit group is stored as a row of data in the circular buffer; and
   a synchronization detector operably coupled to the address generation unit and the circular buffer, wherein the synchronization detector compares bit columns of a predetermined set of bit groups of the plurality of bit groups with a synchronization pattern, and wherein the synchronization detector generates a synchronization detection signal when one of the bit columns of the predetermined set of bit groups substantially matches the synchronization pattern.

13. A method for detecting a synchronization signal in a multi-media data transmission, the method comprising the steps of:
   receiving a plurality of bit groups, wherein the plurality of bit groups represents at least a portion of the multi-media data transmission;
   storing the plurality of bit groups into a memory based on a predetermined storage technique, wherein each bit group of the plurality of bit groups is stored as a row of data in the memory to form a column of bit groups having a first index referencing all bits associated with a first row location, and a second index referencing all bits associated with a second row location;
   retrieving at least a first set of bit groups of the plurality of bit groups from predetermined locations of the memory; and
   scanning a data referenced by the first index and data referenced by the second index to determine if a synchronization signal is referenced by the first of the second data.

* * * * *

UNITED STATES PATENT AND TRADEMARK OFFICE
CERTIFICATE OF CORRECTION

PATENT NO.   : 6,567,424 B1
DATED        : May 4, 2003
INVENTOR(S)  : James W. Girardeau, Jr.

It is certified that error appears in the above-identified patent and that said Letters Patent is hereby corrected as shown below:

Column 10,
Line 28, change "scanning" to -- monitoring --;
Line 29, delete "index locations";
Line 29, change "scanning" to -- monitoring --.

Signed and Sealed this

Thirtieth Day of December, 2003

JAMES E. ROGAN
*Director of the United States Patent and Trademark Office*